No. 883,134.  
PATENTED MAR. 24, 1908.  
F. E. GRIFFETH.  
DEVICE FOR ATTACHING AND DETACHING HORSES TO AND FROM VEHICLES.  
APPLICATION FILED MAY 1, 1907.  
2 SHEETS—SHEET 1.
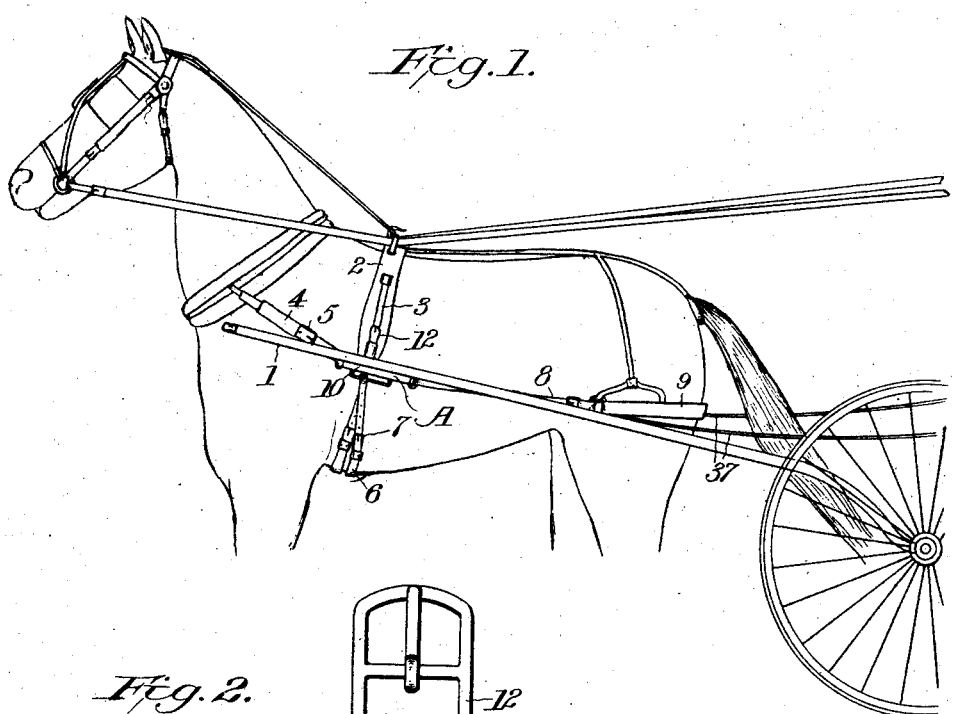
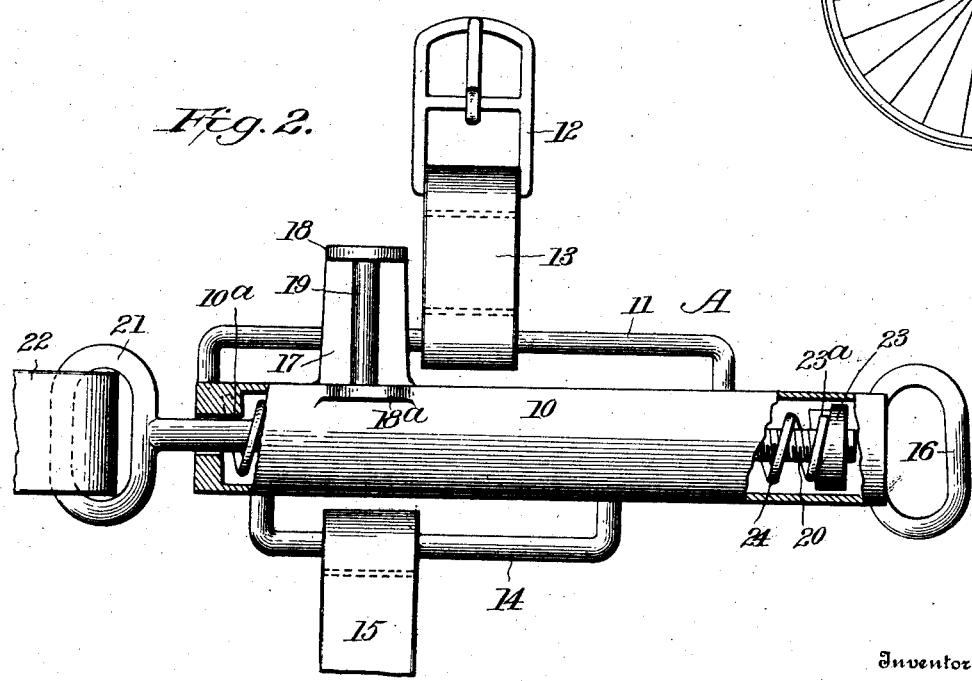

No. 883,134. PATENTED MAR. 24, 1908.
F. E. GRIFFETH.
DEVICE FOR ATTACHING AND DETACHING HORSES TO AND FROM VEHICLES.
APPLICATION FILED MAY 1, 1907.
2 SHEETS—SHEET 2.
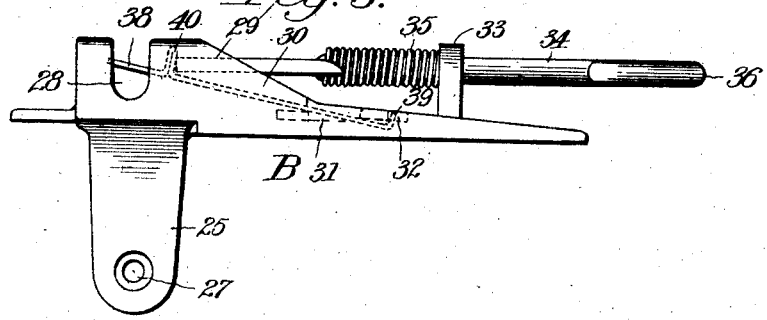
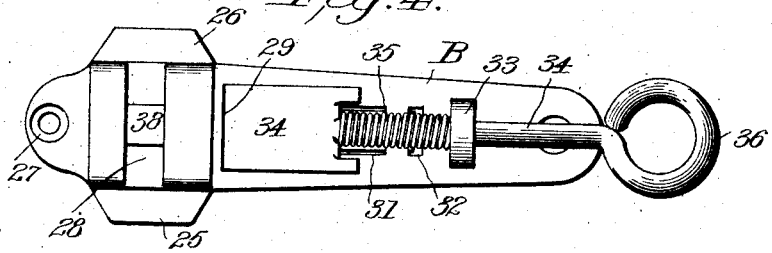
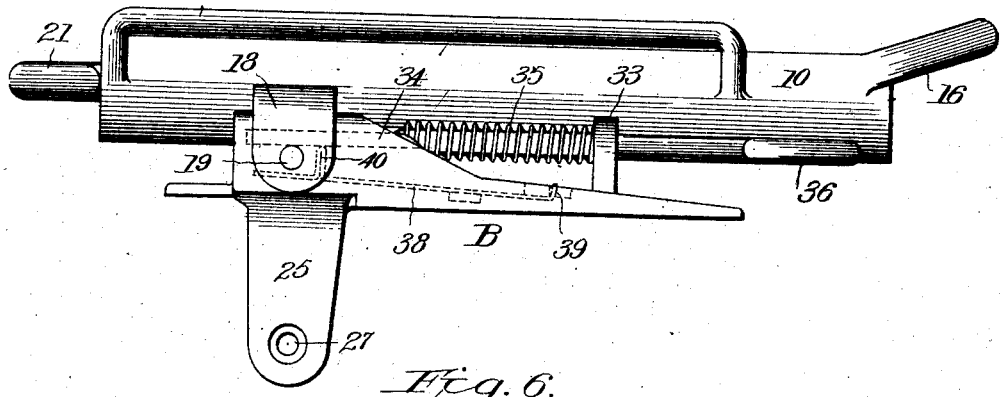
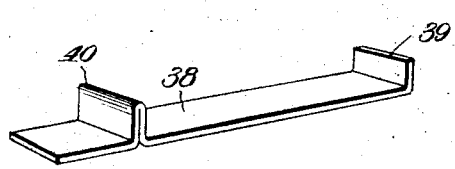
Witnesses
Inventor
Francis E. Griffeth,
By Edsen Bro's
Attorneys

UNITED STATES PATENT OFFICE.

FRANCIS E. GRIFFETH, OF ATHENS, GEORGIA, ASSIGNOR TO GRIFFETH MANUFACTURING COMPANY, OF ATHENS, GEORGIA, A COPARTNERSHIP.

DEVICE FOR ATTACHING AND DETACHING HORSES TO AND FROM VEHICLES.

No. 883,134.     Specification of Letters Patent.     Patented March 24, 1908.

Application filed May 1, 1907. Serial No. 371,334.

*To all whom it may concern:*

Be it known that I, FRANCIS E. GRIFFETH, a citizen of the United States, residing at Athens, in the county of Clarke and State of Georgia, have invented certain new and useful Improvements in Devices for Attaching and Detaching Horses to and from Vehicles; and I do hereby declare the following to be a full, clear, and exact description of the invention, such as will enable others skilled in the art to which it appertains to make and use the same.

My invention relates to improvements in harness and particularly to devices for attaching and detaching horses to and from vehicles. Its objects are, first, to provide a simple contrivance by which the hame tug or breast strap, saddle, hold back and girth are connected on the horse and all these parts attached to or detached from the shafts instantly by one operation instead of hitching or unhitching every part separately, said contrivance being so constructed as to be readily applied to any ordinary single harness and adjusted to fit different sizes of horses; second, to provide means of hitching to the shafts at such a position and in such a manner as to give a direct or straight line of draft from the horse's shoulder to the axle of the vehicle so as to prevent the shafts from pulling downward upon the saddle and the saddle from causing the horse's back to become sore when pulling; third, to provide a draft equalizing contrivance to prevent sudden jerks on the horse's shoulder and a rod on which the saddle strap can slide back and forth to allow the shafts to go forward until the hold backs tighten, when going down hill, without pushing the saddle forward upon the horse's back; fourth, to provide an economical means by which the long traces, shaft tugs, and swingletree may be dispensed with; and fifth, to provide an easily operated device by which, in case of a runaway or other accident, the horse may be instantly detached from the shafts by the driver when seated in the vehicle.

With these ends in view, my invention consists in the peculiar construction and novel combinations and arrangements of parts hereinafter more fully described and claimed.

In the accompanying drawings, illustrating the preferred embodiment of my invention, Figure 1 is a view showing a horse bearing a set of harness made in accordance with my invention and attached to the shafts of a vehicle. Fig. 2 is a broken view of the appliance to which the harness is connected and containing the draft equalizing contrivance. Fig. 3 is a plan view of the shaft embracing member by which the harness section is detachably connected to the shaft. Fig. 4 is an inner face view of the same. Fig. 5 is a plan view of the parts shown in Figs. 2 and 3 connected together, and Fig. 6 is a detailed view of the flat spring used in the shaft embracing member.

It should be understood that the shafts and harness are of ordinary construction excepting, as above stated, that the traces, shaft tugs and swingletree are dispensed with. The device may be applied to harness with either hames or breast strap.

Referring more particularly to the drawings, 1 designates the shafts; 2 the saddle; 3 the saddle strap; 4 the hame tug or breast strap; 5 the buckle on hame tug or breast strap; 6 the shaft girth; 7 the buckle on the shaft girth; 8 the hold back, and 9 the hip strap.

The hitching and unhitching appliance consists of two sections or members A and B detachably connected together, one section being attached to the harness and the other to the shafts of the vehicle, and made rights and lefts for use on opposite sides of the horse, so that one each of the rights and lefts constitute a set.

A indicates the member of the appliance connected to the harness and containing the draft equalizing contrivance as shown in Fig. 2. Said member consists of a barrel or casing 10, having a long loop or slide bar 11 to which the buckle 12 is slidably connected by the means of a strap 13 designed to connect with the saddle strap 3. Said casing is also provided with the loop or slide bar 14 on which is slidably mounted a strap 15 designed to connect with the buckle 7 on the girth 6. At the rear end of said casing is formed a loop 16 adapted to receive the hold back strap 8 which connects with the hip strap 9. A vertical stud 17 is formed upon the upper side of the barrel 10 near its front end at a right angle thereto and from said stud project outwardly two parallel plates 18 and 18ª connected at their centers by a pin or cross bar 19. Within the barrel 10 is slidably mounted a draft rod 20, having a loop 21 at its outer or forward end to which is attached a strap 22 adapted to connect with the hame tug or breast strap by means of the buckle 5. The inner or rear end of said draft rod is threaded to receive a nut 23 between which and the front end of the barrel 10 is arranged a coiled compression spring 24 mounted upon said draft rod thus providing a yielding connection between the latter and the barrel. The front face of the nut 23 and the inner face of the front end of the barrel 10 are each provided with a notch or recess 23ª and 10ª, respectively, into which the opposite ends of the spring 24 engage. The front end of the spring 24 engages in the recess in the front of the barrel 10 and is thereby prevented from turning in the barrel, and the recess in nut 23 being engaged by the rear end of the spring 24, the nut 23 is locked upon the draft rod 20 and prevented from working loose therefrom while in use. The edge of the recess 23ª in the nut is beveled whereby it may be readily turned onto the draft rod while the end of the spring drops into said recess at each revolution of said nut.

B indicates the member of the appliance which is connected to the shafts of the vehicle and is designed to be detachably connected to the harness section A. This section B is designed to fit against the inside of the shafts at or about the place usually occupied by the shaft tug and has two outwardly projecting plates 25, 26 made to bend around the upper and lower sides of the shaft and fastened securely thereto by means of screws at the points 27. Said member B is provided with a vertical recess or slot 28 in the inner edge thereof, designed to receive the cross bar 19 of section A, said slot having its edges inclined or beveled forwardly and rearwardly, whereby said cross bar on which the draft is either forward or backward, is more readily expelled therefrom when the retaining plunger, presently described, is retracted. A longitudinally extending passage 29 and the slot 30 and two transversely extending passages 31 and 32 are provided in the member B together with a lug or projection 33 formed near the rear end of the clamp. A spring actuated plunger 34 is slidably mounted longitudinally through the passage 29 and lug 33 and designed to slide across the vertical slot 28 and thereby confine the cross bar 19 in said slot. Said plunger is made in the form of a round rod with a flat forward end. A coiled compression spring 35 is mounted on said round rod and bears at its opposite ends against the lug 33 and said flat portion of the plunger thus tending to normally impel said plunger across the vertical slot 28. A ring 36 is formed at the rear end of the plunger 34 adapted to connect with the release cord 37 and forming a suitable means of grasping the plunger 34 when it is desired to detach the horse from the shafts without the use of the cord 37. A flat spring 38 (as shown in detail in Fig. 6) having a projection 39 at its rear end and a projection 40 near its front end, is mounted in the slot 30 with its rear end passing diagonally through the passage 31 and having the projection 39 engaged in the passage 32 and its front end projecting across the vertical slot 28 in a plane with the plunger 34. Said front end is designed to bear against the cross bar 19 on the member A when the parts are connected and tends normally to force it out of the slot 28 when the plunger 34 is withdrawn from across the slot. The projection 40 is designed to engage the front end of the plunger 34 when it is retracted and the cross bar 19 expelled from across the slot 28 thereby retaining said plunger in its retracted position while the members A and B are disconnected. When the cross bar 19 is pressed against the portion of the spring 38, projecting across the vertical slot 28, the projection 40 on said spring will be removed from in front of the plunger, thereby allowing the latter to automatically slide across said slot and confine said cross bar therein.

The operation of the device may be described as follows: The appliance being attached to an ordinary set of single harness as heretofore described, the harness fitted to the horse in the usual way and the horse placed between the shafts 1, so that the harness member A comes opposite the shaft embracing member B, the cross bar 19 of the member A is pressed into the vertical slot 28 of member B, depressing the flat spring 38 which removes the projection 40 from bearing against the front end of the plunger 34, thereby permitting the plunger to automatically slide across said vertical slot and confine said cross bar therein. To detach the horse from the vehicle, it is only necessary to retract the plunger 34 until the front end thereof is engaged by the projection 40 of the flat spring 38, which may be accomplished by a person standing along side the shafts or by pulling on the cords 37 while seated in the vehicle. In case of a runaway or when a horse becomes fractious or unmanageable from any cause, the cords 37 provide means of instantly detaching the horse from the vehicle and, if the vehicle is in motion when the horse is detached, the driver may support the shafts by holding said cords and by pulling on either side guide or steer the vehicle until its momentum is lost.

I claim

1. A device of the character described comprising a member attached to the harness and a member attached to the shaft, said harness carried member having a connecting bar, said shaft carried member having a slot to receive said connecting bar, a reciprocal spring pressed plunger adapted to engage and lock said bar in said slot and means to hold said plunger in its retracted position when said connecting bar is not engaged with said slot.

2. A device of the character described comprising a member attached to the harness and a member attached to the shaft, said harness carried member having a connecting bar, said shaft carried member having a slot to receive said connecting bar, a reciprocal spring pressed plunger adapted to engage and lock said bar in said slot, a spring in said shaft carried member adapted to bear against said connecting bar when in said slot for the purpose of ejecting the same when released by said plunger, and means to hold said plunger in its retracted position when said connecting bar is not engaged with said slot.

3. A device of the character described comprising a member attached to the harness and a member attached to the shaft, said harness carried member having a connecting bar, said shaft carried member having a slot to receive said connecting bar, a retractable spring pressed plunger adapted to lock said bar in said slot, a spring in said shaft carried member adapted to bear against said connecting bar when in said slot for the purpose of ejecting the same when released by said plunger, and a projection on said spring adapted to engage the end of said plunger and hold it in its retracted position when said connecting bar is not engaged with said slot.

4. A device of the character described comprising a member attached to the harness and a member attached to the shaft, said harness carried member having a connecting bar, and provided with a yielding draft rod, said shaft carried member having a slot to receive said connecting bar, a reciprocal spring pressed plunger adapted to engage and lock said bar in said slot and means to hold said plunger in its retracted position when said connecting bar is not engaged with said slot.

In testimony whereof, I affix my signature, in presence of two witnesses.

FRANCIS E. GRIFFETH.

Witnesses:
M. L. BOND,
T. H. NICKERSON.